United States Patent
Goldsmith

[15] 3,685,853
[45] Aug. 22, 1972

[54] LOAD TRANSFER DOLLY
[72] Inventor: Ave S. Goldsmith, Tulsa, Okla.
[73] Assignee: CCI Corporation, Tulsa, Okla.
[22] Filed: Jan. 16, 1970
[21] Appl. No.: 3,404

[52] U.S. Cl............280/81 R, 280/34 A, 280/43.23, 280/109, 280/112, 280/150.5, 280/150 A, 280/405 A
[51] Int. Cl............................B60s 9/00, B60p 3/16
[58] Field of Search....280/81 R, 81 A, 481 B, 43.23, 280/112, 405 A, 150.5, 34 A

[56] References Cited
UNITED STATES PATENTS

| | | | |
|---|---|---|---|
| 1,366,771 | 1/1921 | Devencenzi | 280/34 R |
| 2,268,465 | 12/1941 | Townsend | 280/109 |
| 2,490,014 | 12/1949 | Brand | 280/34 X |
| 3,191,963 | 6/1965 | Prichard | 180/79.2 X |
| 2,433,268 | 12/1947 | Fellabaum | 280/8 UX |
| 3,442,409 | 5/1969 | Larson | 280/81 X |
| 3,101,958 | 8/1963 | Gerou | 280/81 X |
| 2,848,244 | 8/1958 | Georgi | 280/81 A |

*Primary Examiner*—Benjamin Hersh
*Assistant Examiner*—John P. Silverstrim
*Attorney*—Head & Johnson

[57] ABSTRACT

Axle vehicle loads are transferred or equalized utilizing a wheeled dolly to create a variable wheelbase which is adapted to be moved from a retracted position on the basic vehicle frame to a maximum outward position. The axle and wheels of the load transfer dolly are pivoted from an inoperative, above-the-road position downwardly to engagement with the road and, by the application of additional pressure, will take up a portion of the load of the vehicle.

6 Claims, 8 Drawing Figures

INVENTOR.
AVE S. GOLDSMITH
BY Head & Johnson
ATTORNEYS

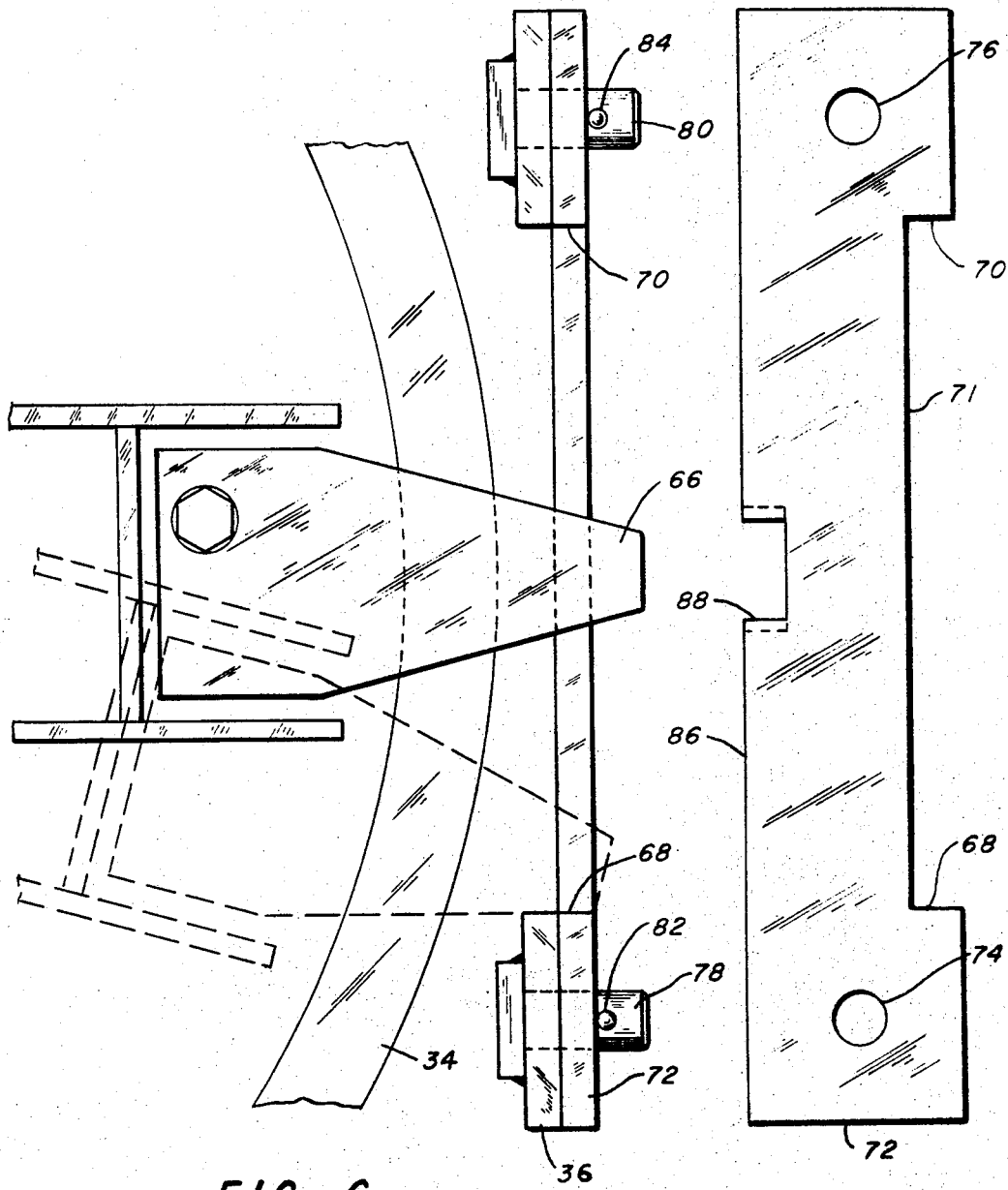

LOAD TRANSFER DOLLY

BACKGROUND OF THE INVENTION

This invention pertains to the field of land vehicles and, more particularly, to a device for attachment to an existing vehicle frame, as for example, that of a conventional transit mixer or other type of load carrying vehicles.

PRIOR ART

| | |
|---|---|
| 2,902,289—North | 3,191,961—Brennan, et al. |
| 2,974,976—Lyall | 3,191,963—Pritchard |
| 3,038,704—Cook | 3,246,884—Pritchard, et al. |
| 3,112,100—Pritchard | 3,298,706—Lyall |
| 3,156,484—Talbert | 3,317,193—Buelow, et al. |
| 3,161,418—Brennan, et al. | |

The apparatus shown in the prior art, however, have not been entirely satisfactory in that they are primarily applicable only to transit mixers and, more particularly, have incorporated, with the transfer device, integral parts of mixers such as the input and discharge chutes. Further, such devices have not permitted adjustable fore and aft shift in the location of the auxiliary axle, relative to the usual fixed vehicle axles for situations of limited space or turning radius or to allow a change in the axle load conditions.

SUMMARY

The invention provides an auxiliary wheeled dolly for a vehicle which provides a variety of use situations including, but not limited to, being positionable in a number of positions varying from fully retracted to fully extended relative to the frame of the vehicle; said dolly also being pivotal to provide a desired pressure force between the wheels and the frame to shift or equalize the load on one or more fixed axles of said vehicle; and being also positionable in a fixed, non-steerable or "tag axle" relationship to the vehicle as a safety means in backing up or where the vehicle is operating on a steep grade.

This invention further provides a device for equalizing and transferring axle loads which can be quickly and completely disconnected from the main vehicle for service and maintenance without causing down time of the vehicle. A further object of this invention is to provide apparatus that is applicable to other vehicles than mixer carriers, e.g., vehicles for hauling concrete blocks or bricks and, as such, is a device which will not interfere with loading or unloading of materials on the vehicle.

A yet further object of this invention is to provide a bearing type fifth wheel arrangement between the load transfer dolly and the vehicle frame which permits improved tracking of the dolly and eliminates wheel wobble found in caster-type wheels. The load transfer device of this invention laterally oscillates with undulations in the road while maintaining adjustable lateral stability. In addition, the device of this invention is capable of movement inward or outward from the vehicle frame and thereby will change the location of the trailing axle behind the vehicle for different leverage conditions and, in some instances, without changing hydraulic load conditions. This invention further provides an improved hydraulic system for operating the load transfer device and which allows application of desired axial load conditions on all wheels of the vehicle.

These and other objects of the invention, as improvements over that known in the art heretofore, will become more apparent upon further reading of the specification and claims, taken in conjunction with the following drawings.

BRIEF DESCRIPTION OF THE DRAWINGS

FIG. 5 is a partial sectional view depicting the latching mechanism to retain the dolly to the basic vehicle frame.

FIG. 6 is a partial top view of an embodiment depicting means to restrict the tracking oscillation of the dolly FIG. 7 is a frontal view of the restriction plate shown in FIG. 6.

DESCRIPTION OF THE PREFERRED EMBODIMENT

Before describing the present invention in detail, it is to be understood that the invention is not limited in its application to the details of construction and arrangement of parts illustrated, since the invention is capable of other embodiments and of being practiced or carried out in various ways. Also, it is to be understood that the phraseology or terminology employed herein is for the purpose of description and not of limitation.

Figure 1:
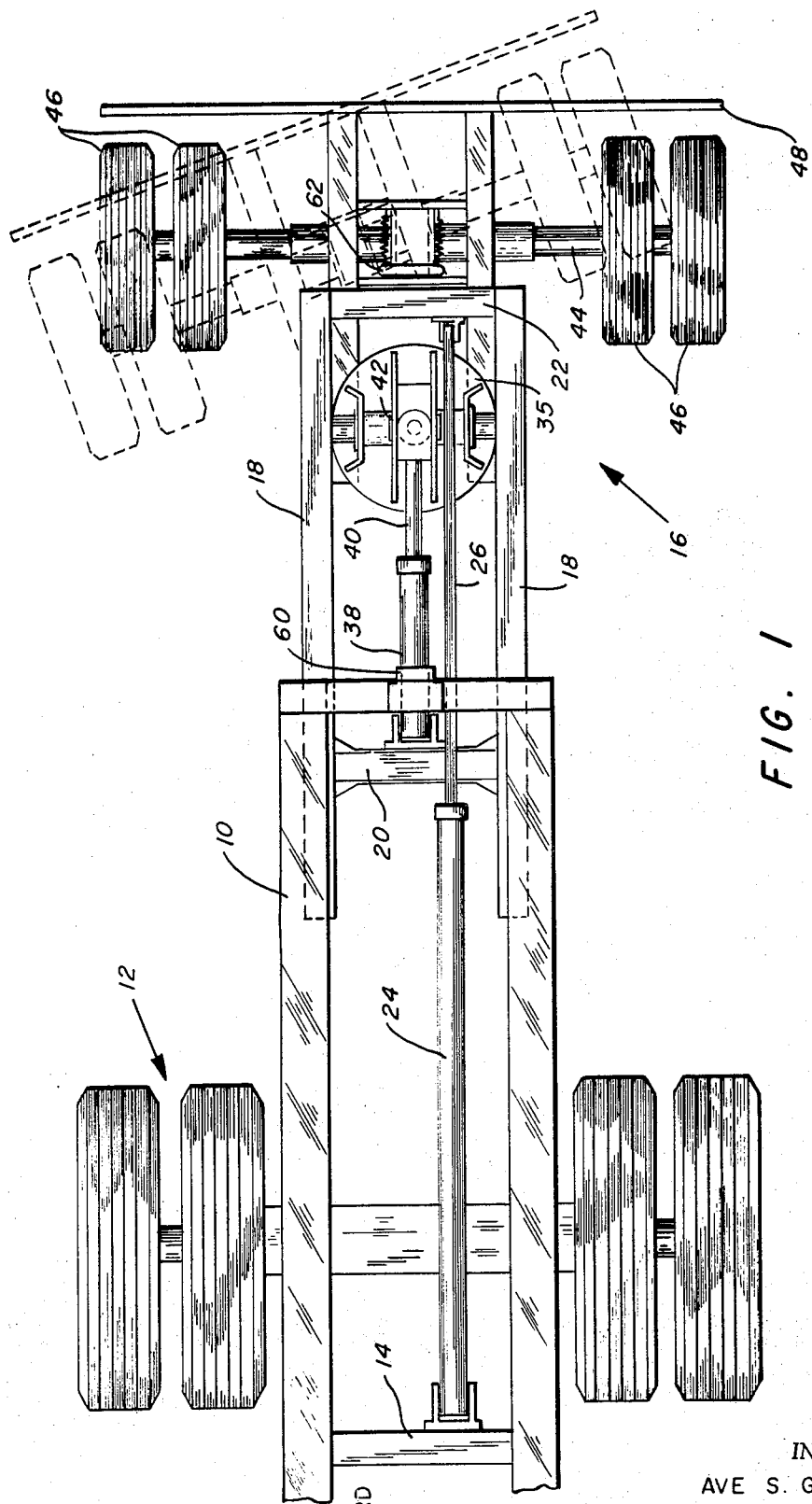
FIG. 1 is a top elevational view showing the rear portion of a vehicle carrier and the load transfer dolly of this invention in an extended position.
Figure 2:
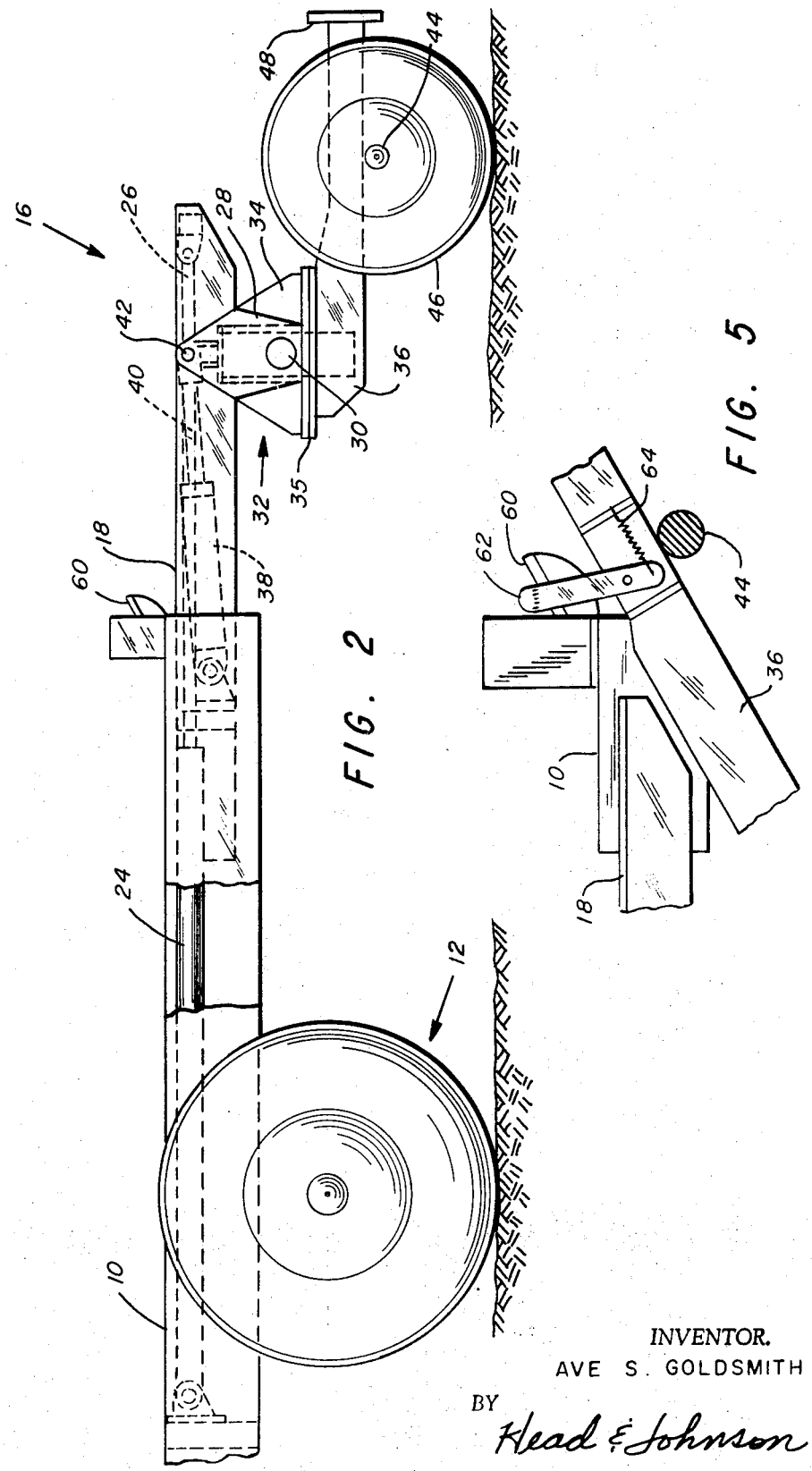
FIG. 2 is a side elevational view of that portion shown in FIG. 1.
Figure 3:
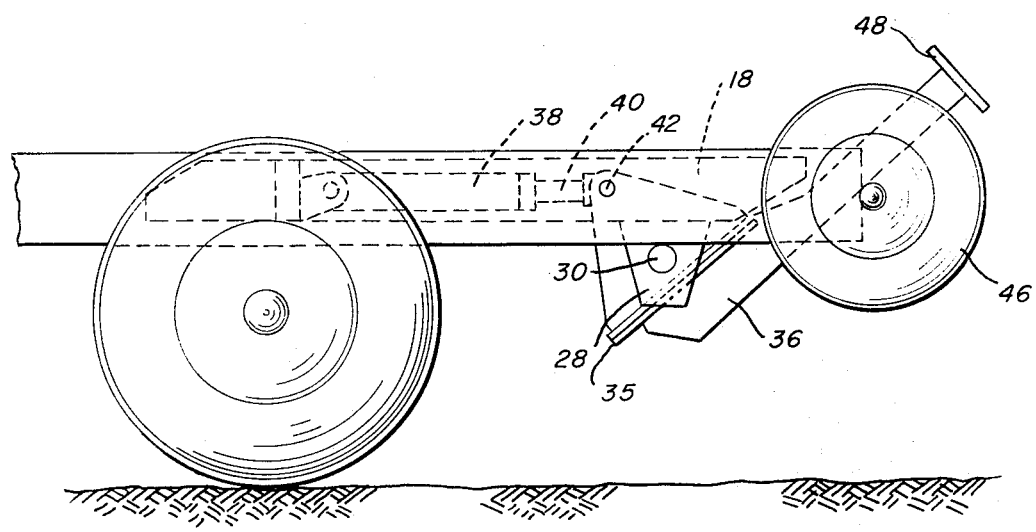
FIG. 3 is a partial side elevational view showing the load transfer dolly of this invention in its retracted position.
Figure 4:
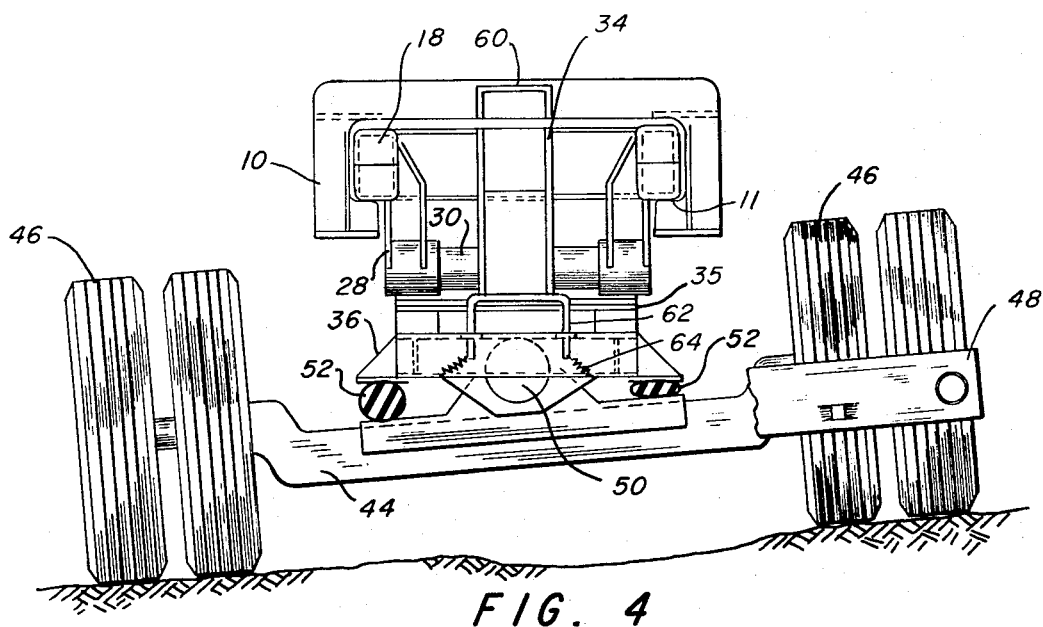
FIG. 4 is an end view depicting the load transfer dolly of this invention in a laterally oscillated position.

For the purpose of simplification the drawings show only the rear portion of a typical vehicle or fifth wheel mounted carrier frame 10 which may have one or more fixed rear wheeled axles generally designated by the numeral 12 and one or more forward wheeled axles, not shown. The frame may include one or more cross braces as at 14. The load transfer dolly of this invention is generally designated by the numeral 16 and includes parallel frame members 18 supported by a forward cross member 20 and a rearward cross member 22. A first hydraulic cylinder 24 is attached at its cylinder end to the vehicle frame cross member 14 while the rod end 26 is attached to the rearward cross member 22 of the transfer dolly of this invention. The frame members 18 are adaptable to slide forwardly and rearwardly upon an appropriate track 11 within the frame 10 from a position such as shown in FIG. 3 outwardly to a position as shown in FIGS. 1 and 2 by actuation of the hydraulic cylinder and rod 24 and 26. The dolly frame assembly 18 includes downwardly extending arms 28 which are adapted to support a first axis or shaft 30 which is horizontal and transverse to the frame 18 and extends through a type of fifth wheel assembly generally designated by the numeral 32. The assembly 32 pivots about shaft 30 in a vertical plane from and between a retracted position as shown in FIG. 3 to a position where the dolly wheels 46 are in ground or road and load force engaging position. The assembly 32 includes an upper mounting plate 34 interconnected to a lower mounting plate 36 by a bearing assembly 35 which permits relative, fifth wheel like rotation of lower mounting frame 36 to upper mounting bracket 34 about an imaginary second axis which is in a plane transverse to said first axis. This relative movement allows the lower frame assembly and the wheeled axle 44 to freely pivot and trail the vehicle within the limits described hereafter in reference to FIGS. 6 and 7. Pivotation of the assembly 32 occurs utilizing hydraulic or pneumatic cylinder 38 which is attached at one end to the cross frame 20 while the piston rod 40 is pivotally attached to the upper mounting plate 34 about shaft 42. The lower mounting frame member 36 includes axle 44 having spaced wheels 46 rotatably supported, in the load transfer position, on the ground or road surface. A rear protecting bumper 48 may be utilized in addition to other auxiliary equipment, not shown, such as fenders and mud flaps. As best described in FIG. 4, the axle 44 is further pivoted about a third axis generally parallel with the forward-rearward axis of the load transfer dolly by the provision of shaft 50 which interconnects the axle 44 to the lower support frame 36. This connection permits limited movement in a plane transverse to the forward-rearward axis for irregular surfaces such as described in FIG. 4. Resilient bumper members 52 are provided between the lower frame 36 and the axle 44 and act as a shock absorbing means and are mounted to provide adjustable means for greater or less resistance to the oscillatory movement of the axle 44.

A latch mechanism includes a portion 60 fixed to the end of vehicle frame 10 and a pivotal latch 62 attached to the dolly assembly 32. The latch 62 is biased by a spring 64 normally forward. The latch is adapted to be used when the transfer dolly 16 is pivoted upwardly in its non-use position. The partial view of FIG. 5 depicts the latched position.

Referring now to FIG. 6, an additional embodiment of this invention is described. In normal operation of the load transfer dolly, the bearing assembly 35 is fixed in its pivotal movement to about 15° each side of the forward-rearward axis by the relationship of a tongue 66 which is affixed to the upper mounting plate 34 of the bearing assembly 35. Plate 72, as best shown in FIG. 7, is formed with openings 74 and 76 at each end for adaptation about pins 78 and 80 being retained by lock pins 82 and 84. Pins 78 and 80 are rigidly formed to the lower mounting plate 36. Hence, plate 72 pivots relative to the upper mounting plate as shown by the dotted lines of FIG. 6. However, it is to be understood that the mechanism is reversible, i.e., tongue 66 fixed to lower mounting plate 36 while the restriction plate 72 is affixed to the upper mounting plate 34. The plate 72 is reversible wherein the edge 86 is placed so that the tongue member 66 can be locked within notch 88 and hence, under certain circumstances when so desired, prevents any relative pivotation of the load transfer dolly about the second vertical axis. For example, when it is desired to back the vehicle and hence prevent the pivotation of the transfer dolly wheels, plate 72 is positioned with edge 86 and notch 88 upwardly in engagement with tongue 66. During normal operations the plate is then reversed with edge 71 terminating in ends 68 and 70 allowing the pivotal movement of the transfer dolly.

Figure 8:
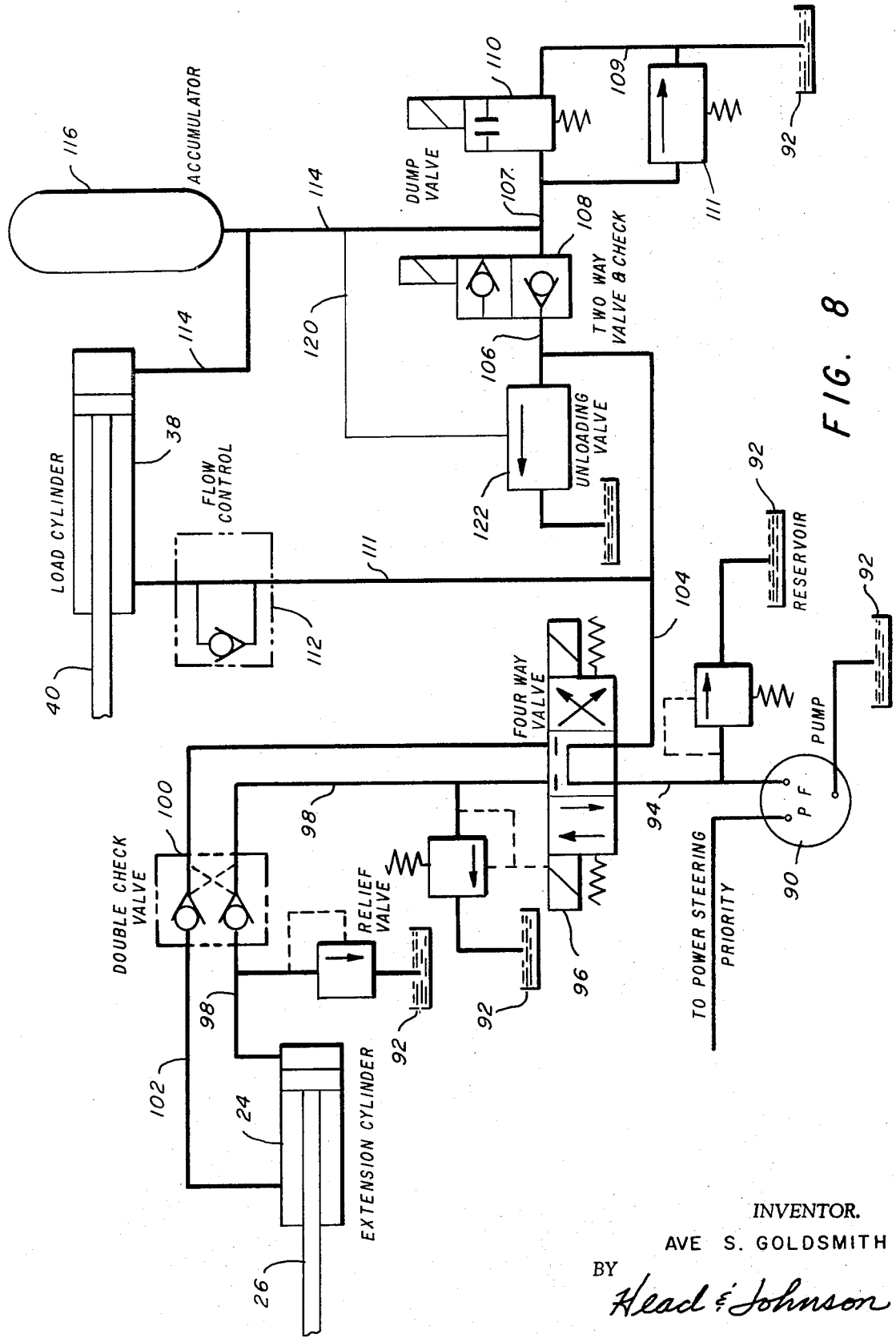
FIG. 8 is a schematic drawing of the hydraulic system used in conjunction with the load transfer dolly of this invention.

The operation and usage of the load transfer dolly of this invention may be understood with reference to the various previously described views and to the schematic diagram of FIG. 8 depicting the hydraulic control system. Beginning at a normally inoperative position the dolly extension frame 16 is retracted forwardly within the frame 10 and generally to that position shown in FIG. 3. As such, the pivotal latch 62 retains the weight of the axle 44 and wheels 46 such as shown in FIG. 5. When it is desired to use the load transfer dolly, suitable controls located within the vehicle operator compartment are actuated. The dolly is first extended to its outer position, which may be any position between fully retracted and fully extended. This is accomplished hydraulically by a pump 90 which may be either a separate power take-off driven pump or may be readily combined with an available power source such as the power steering system of the vehicle. A common tank or reservoir 92 will contain the liquid and, although schematically shown in other portions of the drawing, it may be considered as a common reservoir. Fluid traverses through line 94 into a four-way solenoid-operated valve 96 which the operator has positioned to allow flow of hydraulic pressure fluid through line 98, through double check valve 100, into the piston side of cylinder 24 forcing the rod 26 and the dolly frame outward to a position as for example shown in FIGS. 1 and 2. Fluid on the rod side of the cylinder 24 is allowed to flow through conduit 102, because of a pilot crossover arrangement within the double check valve 100, back through the four-way valve 96, through conduits 104 and 106, thence through two-way valve and check 108, conduit 107 and normally open dump valve 110 to the reservoir 92. Once the desired extended position is reached, the four-way valve is closed trapping the hydraulic pressure fluids in the extension system. As the dolly is being extended, the latch 62 will ride upon the upper surface of fixed latch 60 until free thereof at which time the load transfer dolly will pivot about shaft 30 to the ground. The dolly will fall slowly because of a flow control restriction 112, the fluid flowing from the rod 40 side of load cylinder 38 through conduits 104, 106 and 107 to the reservoir. To apply load transfer force, once the required position is reached, the dump valve 110 is closed to allow pressure fluid through lines 94, 104, 106, two-way valve and check 108, line 114 to a hydraulic accumulator 116 and via conduit 118 to the piston side of cylinder 38. Flow also enters pilot conduit 120 which is used to actuate, upon desired pressure conditions, unloading valve 122. The amount of pressure in conduit 114 and accumulator 116 will, of course, depend upon the amount of load being carried by the vehicle or carrier and upon the desired transfer or equalization of axle load between the vehicle wheels. The desired amount of pressure is applied to move the piston within the load cylinder 38 with the flow of fluid on the rod side being controlled through conduit 111 back into the system. Once the desired pressure setting of unloading valve 122 is reached the valve will permit dumping of the pressure fluid flow from line 104 to reservoir through the valve, thus materially lowering at that instant the pressure differential between the piston side and the rod side of the load cylinder 38 allowing the application of desired pressure forces to the piston side and hence the dolly wheels. In this condition as the vehicle is allowed to traverse over the ground surface irregularities are constantly transferred from the wheels 46 and axle 44 into the load cylinder piston via rod 40. As such, the load cylinder must be adaptable to accept and withdraw fluid on either side of the piston and act as a dampening means to the variations in the road traveled. This is accomplished on the rod side by maintaining a constant source of low pressure fluid operating through conduits 104 and 111 through the flow control bypass 112. On the piston side this is accomplished by the constant tendency when the pressure is lessened to pump further fluid through conduits 104, 106, two-way valve and check 108 and conduit 114 in the event there is a sudden change in the load cylinder piston as for example when the wheels 46 fall into a depression in the ground or road surface. Pressure surges on the piston side of cylinder 38 are normally dampened by accumulator 116. Relief valve 111 is set to relieve excessive pressure surges in conduits 114 and 107 as may be caused when axle 44 is traversing severe irregularities in the road.

For changes in the load condition, e.g., removal of a portion of the pay load, the dolly forces may be easily redistributed. In one method, the operator first opens dump valve 110. The four-way valve 96 is actuated to retract the extension frame 18 to a predetermined position corresponding to the pay load. Dump valve 110 is then closed and the dolly axle 44 is repressurized.

In another method the pressure setting of unloading valve 122 is changed corresponding to the new pay load. If the vehicle has removed its load the dolly is fully retracted and latched as shown in FIGS. 3 and 5.

Although this invention has been described with reference to specific and preferred embodiments, it is understood that various changes may be made in its construction by those skilled in the art without departing from the spirit of the invention as defined in the appended claims.

What is claimed:

1. A dolly to increase the wheeled, load carrying capacity of a given vehicle comprising:
    an extensible frame movable rearwardly and forwardly upon the rear end frame of said vehicle;
    means to move said extensible frame from or to a position substantially beneath said rear end frame rearwardly to a desired position;
    an axle having wheels on the ends thereof spaced about the same track as said vehicle wheels, said axle mounted to said extensible frame so as to pivot relative thereto:
    1. about a first horizontal transverse axis; and
    2. about a second axis which is in a transverse plane to said first axis whereby said wheeled axle trails with said vehicle; and
    3. about a third axis substantially parallel to the forward-rearward axis of said extensible frame, whereby said wheeled axle pivots in a transverse plane to said extensible frame; and
    means to controllably pivot said wheeled axle about said first horizontal transverse axis from and between a position where said wheels are off the ground to a position on the ground.

2. A dolly of claim 1 wherein said wheeled axle mounting comprises:
    an upper mounting plate pivotally movable about said first axis;
    a lower mounting plate rotatably supported to said upper mounting plate about said second axis; and
    means to rotatably support said axle to said lower mounting plate about said third axis.

3. A dolly of claim 1 including means to releasably latch said wheeled axle to said vehicle frame in said above-the-ground position.

4. A dolly according to claim 2 including means to limit the relative side to side rotation of said lower and upper mounting plates.

5. A dolly according to claim 4 including means to lock said lower mounting plate to said upper mounting plate in a fixed position.

6. A dolly in accord with claim 1 including resilient bumper members positioned between said extension frame and said axle to restrict the rotatable movement of said axle about said third axis.

* * * * *